United States Patent [19]

Schoenberg

[11] 4,182,823

[45] Jan. 8, 1980

[54] ANIONIC POLYMERIZATION INHIBITOR FOR CYANOACRYLATE ADHESIVES

[75] Inventor: Jules E. Schoenberg, Scotch Plains, N.J.

[73] Assignee: National Starch and Chemical Corporation, Bridgewater, N.J.

[21] Appl. No.: 934,856

[22] Filed: Aug. 18, 1978

[51] Int. Cl.$^2$ .................... C08F 2/40; C08F 120/50
[52] U.S. Cl. .................... 526/298; 260/465.4; 428/500
[58] Field of Search .................... 526/298; 260/465.4

[56] References Cited

U.S. PATENT DOCUMENTS

| | | | |
|---|---|---|---|
| 2,912,454 | 11/1959 | McKeever | 260/465.4 |
| 2,926,188 | 2/1960 | McKeever et al. | 260/465.4 |
| 3,728,375 | 4/1973 | Coover et al. | 260/465.4 |

OTHER PUBLICATIONS

*Chem Abs.*, 80, (1974) 15431s.
*J.A.C.S.*, 91, (1969) pp. 317–322.

*Primary Examiner*—Stanford M. Levin
*Attorney, Agent, or Firm*—Edwin Szala; Janet E. Hasak

[57] ABSTRACT

An adhesive composition based on 2-cyanoacrylate esters contains as an anionic polymerization inhibitor an acid chelate formed of boric acid or a derivative thereof and a selected polyhydroxy compound. The chelate is conveniently formed in situ in the 2-cyanoacrylate ester, but may also be prepared separately and added to the ester directly. An exemplary acid chelate used as stabilizer is prepared from boric acid and pyrogallol. The resulting stabilized adhesive compositions have a rapid cure rate and may be used on a wide variety of substrates.

15 Claims, No Drawings

ANIONIC POLYMERIZATION INHIBITOR FOR CYANOACRYLATE ADHESIVES

BACKGROUND OF THE INVENTION

1. Field of the Invention

This invention relates to stabilized 2-cyanoacrylate adhesive compositions. More particularly, this invention is directed to a novel class of anionic polymerization inhibitors for 2-cyanoacrylate adhesive compositions.

2. Description of the Prior Art

Adhesive compositions based on 2-cyanoacrylate esters belong to a class of adhesives known as reactive liquid adhesives. 2-Cyanoacrylate adhesives are single-part, low-viscosity adhesives which are characterized by features such as (1) their ability to polymerize at room temperature without the use of an added catalyst when pressed between two substrates, (2) their rapid rate of cure, and (3) the strength of the bonds produced with a wide variety of substrates. Conventional adhesives, on the other hand, cure, for example, upon application of heat and pressure, addition of catalyst, or evaporation of a solvent. A general review of 2-cyanoacrylate adhesives can be found in I. Skeist's "Handbook of Adhesives", New York: Reinhold Publishing Corporation, 1962, Chapter 31, p. 409–414.

Application of the 2-cyanoacrylate adhesive merely involves spreading a small sample thereof in a thin film between two substrates, pressing the substrates together, and allowing the resultant bond to cure. The adhesive develops sufficient strength after a short period of time to hold the substrates together until the adhesive completely polymerizes and builds up to its maximum bonding strength.

Initiation of polymerization (cure) is generally believed to proceed through an anionic mechanism; the 2-cyanoacrylate adhesives have such a great tendency to polymerize the water itself is a sufficiently active initiator. Hence, when the adhesive is applied to a substrate and thereby exposed to atmospheric and surface moisture, cure normally begins within a relatively short period of time, generally less than one minute, and on many surfaces within a matter of a few seconds. The rapid cure rate of the 2-cyanoacrylate adhesives is particularly advantageous in production line applications.

Due to their tendency to polymerize, 2-cyanoacrylate adhesive compositions normally contain one or more stabilizers. To prevent anionic polymerization an inhibitor such as an acidic gas or a protonic or Lewis acid is normally added to the composition. Examples of acidic gases used for this purpose include sulfur dioxide, nitric oxide, carbon dioxide, hydrogen fluoride, etc. Known protonic acids include mineral acids such as hydrochloric or sulfuric acid, sulfonic acids, and carboxylic acids such as acetic, trichloroacetic, acrylic, methacrylic, and itaconic acid. Examples of anhydrides which are known anionic polymerization inhibitors are carboxylic acid anhydrides such as itaconic and maleic anhydride; phosphoric anhydrides such as phosphorus pentoxide; antimony pentoxide; sultones; acid chlorides; and the like. Anionic polymerization inhibitors which are Lewis acids include stannic chloride, ferric chloride, and boron trifluoride and its etherate complexes. Typical patents disclosing these and other stabilizers are U.S. Pat. Nos. 2,756,251; 2,912,454; 2,926,188; 3,728,375; and 3,993,678; Jap. Pat. Publication No. 49-31619; and Ger. Offen. No. 2,307,834.

Free radical polymerization is generally inhibited in the 2-cyanoacrylate adhesives, if necessary, by adding phenolic-type compounds such as hydroquinone, pyrogallol, or t-butyl catechol thereto.

The acids used to stabilize the adhesive against anionic polymerization must be used with great discretion. Very strong acids, if added in large amounts, can lead to overstabilization of the adhesive; however, weak acids are generally not so effective as the stronger acids in achieving stabilization. In addition, all of the acids which act as anionic polymerization inhibitors exert a retarding effect on the cure rate of the adhesive, to a greater or lesser degree, depending on the specific acid used. Carboxylic acids, for example, generally retard the cure rate to a large extent.

Accordingly, it is an object of the present invention to provide a class of effective anionic polymerization inhibitors for 2-cyanoacrylate adhesive compositions which do not significantly retard the cure rate of the adhesive.

SUMMARY OF THE INVENTION

The above and related objects are achieved in the preparation of an adhesive composition comprising a mixture of:

A. at least 65% by weight of a monomeric ester of 2-cyanoacrylic acid of the general formula:

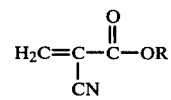

wherein R is an alkyl group having 1 to 10 carbon atoms, an alkenyl group having 2 to 10 carbon atoms, a cyclohexyl group, or a phenyl group; and B. a stabilizing amount of an acid chelate formed from reaction of boric acid, or a derivative thereof, with a polyhydroxy compound capable of forming the chelate and containing no reactive groups which can initiate anionic polymerization.

Preferably, the boric acid derivative is an anhydride or borate ester derivative, and, most preferably, boric oxide or a trialkyl borate. The applicable polyhydroxy compound generally has at least two hydroxyl groups attached to adjacent carbon atoms or to carbon atoms separated by one atom, depending on the orientation of the hydroxyl groups, to form a five- or six-membered-ring chelate with the boric acid. It is preferred that at least one of the hydroxyl groups of the polyhydroxy compound which react to form the chelate is slightly acidic (e.g., attached to a carbon atom containing a multiple bond), to avoid destabilization of the adhesive. The preferred polyhydroxy compounds herein are ortho-dihydroxybenzenes, ortho-hydroxybenzoic acids, aliphatic α-hydroxy acids, and aliphatic dicarboxylic acids.

In one embodiment of this invention, the preformed chelate is added to the 2-cyanoacrylate adhesive in a separate step, in an amount of 10–600 ppm., based on the amount of 2-cyanoacrylate ester.

In another embodiment, the chelate is formed in situ by adding the boric acid compound and polyhydroxy compound separately to the ester in quantities sufficient to provide a stabilizing amount of chelate in the adhesive. The preferred amounts of boric acid compound and polyhydroxy compound added are 5-1000 ppm. and 5-500 ppm., respectively, based on monomeric ester.

The boric acid chelates of this invention are themselves well known in the art; and those formed in aqueous solution are described, for example, in "Advances in Carbohydrate Chemistry" (edited by W. Pigman and M. Wolfrom), Vol. 4, New York: Academic Press Inc., 1949, pp. 189-210. These acid chelates, which are known to be much stronger acids than boric acid, act as very effective stabilizers against anionic polymerization of 2-cyanoacrylate adhesives, being superior to the boric acid or the polyhydroxy compound alone. Unexpectedly, the chelates used herein are found to cause very little retardation in the cure rate of the adhesive. Unlike the boron trifluorides or etherates thereof used in the prior art as stabilizers for 2-cyanoacrylate adhesives, which compounds are Lewis acids, the chelates employed herein are protonic acids.

DESCRIPTION OF THE PREFERRED EMBODIMENTS

As used herein, the term "adhesive composition" refers to an adhesive comprising at least 65% by weight, based on the total composition, of a monomeric ester or mixture of esters of 2-cyanoacrylic acid of the general formula given hereinabove. For purposes of this invention, the preferred esters are those wherein the R group is an alkyl or alkenyl group having 1 to 4 carbon atoms, and, more particularly, a methyl, ethyl, allyl, or iso- or n-butyl group. Especially preferred esters for preparing the adhesives of this invention are methyl and ethyl 2-cyanoacrylates due to their commercial availability.

The above-mentioned monomeric esters of 2-cyanoacrylic acid may be prepared by methods well known in the art such as those described in U.S. Pat. Nos. 2,467,926; 2,467,927; and 3,254,111; the disclosures of which are incorporated herein by reference.

As the novel feature of this invention, an acid chelate formed from reaction of a boric acid compound (i.e., boric acid or its derivatives) and a polyhydroxy compound defined hereinbelow is used to inhibit anionic polymerization of 2-cyanoacrylate esters. These chelates may be prepared separately and added to the 2-cyanoacrylate ester directly, or they may be formed in situ in the ester. When prepared separately, the chelates are typically produced, in a known procedure, by heating the boric acid or derivative thereof with a stoichiometric amount, or a molar excess, of the appropriate polyhydroxy compound, generally in a solvent, until reaction is complete. The lower-boiling by-product thereby produced is driven-off, during or after reaction; and the chelate product is then isolated from the reaction mixture and added directly to the 2-cyanoacrylate ester. The main advantage of preparing the chelate in a separate step is that the reaction by-product(s) (in particular, water, when boric acid or boric oxide are employed) is not introduced into the 2-cyanoacrylate ester. According to U.S. Pat. No. 3,728,375, the presence of water in the 2-cyanoacrylate ester has a detrimental effect on the performance of the adhesive.

In another embodiment of this invention, the chelate is conveniently prepared in situ in the 2-cyanoacrylate ester by dissolving appropriate amounts of the polyhydroxy and boric acid compounds in the ester at room temperature. The formation of the chelate, which is at all times in equilibrium with the polyhydroxy and boric acid compounds, occurs rapidly.

The exact structure of the chelates used as stabilizers herein cannot be determined with certainty and varies with the polyhydroxy and boric acid compounds and relative amounts thereof used. In general, the chelate is of the AB or $AB_2$ types, wherein A is the boric acid compound and B is the chelating ligand from the polyhydroxy compound. It is, however, possible that a chelate of the $A_2B$ type could be formed when a polyhydroxy compound having several reactive hydroxyl groups such as tartaric acid is employed. While the present invention is not to be limited by any one theory, it is believed that the chelates described herein have one or more of the following general structures reported in the literature:

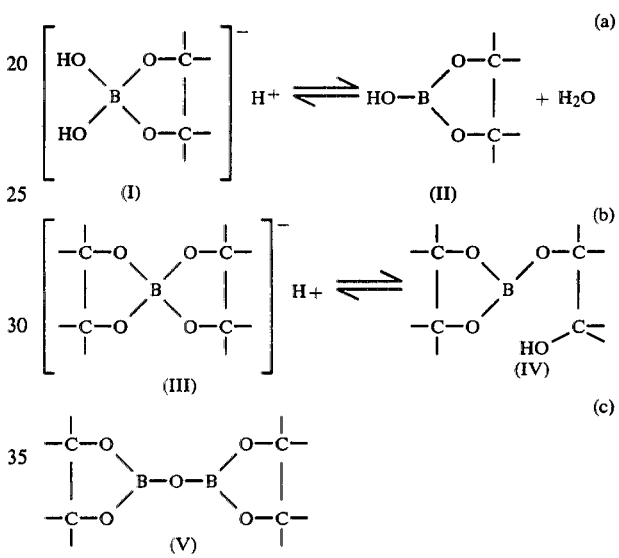

wherein the carbon atoms may be directly bonded to each other or separated by one or more atoms. It can be seen that Structures (I) and (III) represent strong protonic acids, the former being an AB-type chelate and the latter an $AB_2$-type chelate having a spirane structure with boron as the central atom. The practitioner will recognize that more than one type of polyhydroxy compound may be used to form the AB-type chelate, if the equilibrium is favorable, in which case an unsymmetrical spirane will be obtained. It is also within the scope of this invention to employ a protonic acid, AB-type chelate connecting all four oxygen atoms together, which chelate could be formed if four hydroxyl groups of one molecule of polyhydroxy compound reacted with one molecule of boric acid compound to form the spirane.

The compounds which are used to provide the boron atom in the chelate are ortho-boric acid (commonly known, and referred to herein, as boric acid), or any derivatives thereof which form boric acid and/or tetravalent monoborate ions in the 2-cyanoacrylate ester, or are able to react directly with the polyhydroxy compound to form the chelate. The preferred boric acid derivatives for this invention are anhydrides and borate ester derivatives. As used herein, the term "anhydrides" refers not only to boric acid anhydrides such as boric oxide ($B_2O_3$) and meta-boric acid ($HBO_2$), but also includes mixed anhydrides of boric acid and other acids such as carboxylic acids. Examples of borate ester derivatives include alkyl borates, which can be mono-, di-, or trisubstituted, such as, e.g., triethyl borate, and the like. The derivatives herein which are particularly preferred are boric oxide and trialkyl borates.

The polyhydroxy compounds applicable to this invention may be aliphatic, alicyclic, aromatic, condensed aromatic (e.g., naphthylic), or arene compounds, all of which can additionally contain unsaturated groups and/or ether, ester or amido linkages, or heteroatoms. To be suitable herein, however, the polyhydroxy compounds must contain at least two hydroxyl groups and be capable of forming a stable chelate with boric acid. In addition, these compounds must be at least somewhat soluble in the 2-cyanoacrylate ester employed and must have no groups such as amino groups which would initiate anionic polymerization and thus adversely affect the stabilizing properties of the chelate.

The term "hydroxyl group" as used herein is meant to include the -OH groups such as are contained in alcohols, phenols, and carboxylic acids. The preferred types of hydroxyl groups are those which are slightly acidic, because any unreacted (non-chelated) hydroxyl groups which are non-acidic may act to initiate polymerization, thus destabilizing the adhesive, or may undergo transesterification with the 2-cyanoacrylate ester. An example of an acidic hydroxyl group is one attached to a carbon atom containing a multiple bond such as depicted below:

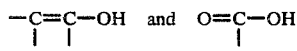

When the hydroxyl groups are strongly acidic, however, the adhesive may become overstabilized, so that very acidic polyhydroxy compounds must be added only in small amounts.

The types of polyhydroxy compounds which meet the requirements specified above include polyols, i.e., phenols and alcohols; hydroxy acids; and dicarboxylic acids. Not all of the compounds falling within these categories, however, will form the desired chelates, as is explained further in detail hereinbelow.

A deciding factor in determining the suitability of the polyhydroxy compound as a chelating agent for the boric acid is the stereochemistry of the hydroxyl groups, i.e., their orientation with respect to each other. In general, the polyhydroxy compounds must have at least two hydroxyl groups attached to adjacent carbon atoms or to carbon atoms separated by one atom to form a stable five- or six-membered-ring chelate. The specific locations of the hydroxyl groups, however, depend on the polyhydroxy compound itself. For example, to be suitable as polyhydroxy compounds herein, aliphatic polyols (i.e., alcohols) must have at least two hydroxyl groups which are favorably situated for the formation of a chelate. Non-cyclic 1,2-glycols do not form chelates because of the mutual repulsion of the hydroxyl groups. The presence of additional hydroxyl groups suitably located in the compound prevents this repulsion to enable formation of a chelate with boric acid. As the number of adjacent hydroxyl groups is increased, the two hydroxyl groups become more favorably situated to form the chelate. Thus, ethylene glycol and glycerol do not form boric acid chelates to any significant degree, while erythritol, adonitol, and xylitol are increasingly effective in forming the chelates.

As to the applicable aliphatic hydroxy acids, the α-hydroxy acids such as, e.g., tartaric acid, α-hydroxyacetic acid, and α-hydroxypropionic acid are suitable polyhydroxy compounds herein; whereas the β-hydroxy acids such as β-hydroxyacetic acid, lactic acid, and β-hydroxybutyric acid do not normally form chelates.

With the alicyclic polyhydroxy compounds, formation of chelates depends on the size of the cyclic ring of the compound and on the relative orientation of the hydroxyl groups. While five-membered-ring polyhydroxy compounds (e.g., cyclopentane-1,2-diols or 2-hydroxycyclopentane carboxylic acids) having the hydroxyl groups in the cis positions form chelates, the corresponding trans isomers do not because of unfavorable geometry. Thus, while the cis isomers of cyclopentane-1,2-diol, 1-methylcyclopentane-1,2-diol, indane-1,2-diol, tetramethylenesulfone-2,3-diol, 2-methyltetramethylenesulfone-2,3-diol, 1,4-dimethyltetramethylenesulfone-2,3-diol, 2-hydroxycyclopentane carboxylic acid, and 5-methyl-2-hydroxycyclopentane carboxylic acid form chelates with boric acid, their trans counterparts are inactive.

In the case of the six-membered-ring, alicyclic polyhydroxy compounds, however, neither the cis nor the trans isomers are effective as chelating agents. Thus, for example, cyclohexane-1,2-diols and 2-hydroxycyclohexane carboxylic acids do not form chelates with boric acid compounds, regardless of the stereochemistry of the hydroxyl groups.

Because the substituents in aromatic compounds are rigidly held in the plane of the benzene ring, the aromatic polyhydroxy compounds suitable herein must contain at least one hydroxyl group which is ortho to another hydroxyl group or carboxyl group on the ring. Thus, ortho-dihydroxybenzenes and ortho-hydroxybenzoic acids (and their condensed aromatic analogs) form chelates, whereas the meta- and para-isomers of these compounds do not. As specific examples, 1,2-hydroxybenzene (catechol), 1,2,3-trihydroxybenzene (pyrogallol), 1,2,4-trihydroxybenzene (hydroxyhydroquinone), 1,2- and 2,3-dihydroxynaphthalene, o-hydroxybenzoic acid (salicylic acid), 2,4-hydroxybenzoic acid, 3,4-dihydroxybenzoic acid (protocatechuic acid), 2,4,5-trihydroxybenzoic acid, and 3,4,5-trihydroxybenzoic acid (gallic acid) and esters thereof are effective chelating agents; while 1,3-dihydroxybenzene (resorcinol), 1,4-dihydroxybenzene (hydroquinone), 1,3,5-trihydroxybenzene (phloroglucinol), 1,3-dihydroxynaphthalene, and m- and p-hydroxybenzoic acid are unable to form chelates.

Certain diacids with adjacent carboxyl groups or carboxyl groups separated by one carbon atom are also suitable polyhydroxy compounds herein, if the other criteria mentioned above are met, but only when the carboxyl groups are properly oriented to form the chelate. Preferred diacids herein are aliphatic dicarboxylic acids.

Specific compounds within the categories given above which are particularly preferred are pyrogallol, catechol, salicyclic acid, tartaric acid, and oxalic acid.

The amount of chelate to be added to the adhesive when the chelate is prepared separately depends on the molecular weight of the chelate, the 2-cyanoacrylate ester employed, and the degree of stabilization required. Generally, however, the concentration range of inhibitor used to stabilize the ester effectively is 10–600 ppm. of the total composition.

The chelate which is formed in situ by adding the reactant compounds to the adhesive must be present in an amount sufficient to stabilize the adhesive. This amount cannot be precisely defined, as it will depend on the equilibrium constants of the reaction between polyhydroxy and boric acid compound, which constants in turn depend on the 2-cyanoacrylate ester and the particular reactants used. The absolute and relative amounts of polyhydroxy and boric acid compounds to be added depend on many factors, including the specific compounds and ester used, and the degree of stabilization required. The amount of polyhydroxy compound added depends on, for example, its strength as a chelating agent, molecular weight, solubility, the number, type and acidity of its hydroxyl groups, and the amount of boric acid added. The polyhydroxy compound is typically used in amounts of from about 5 to 500 ppm., based on the weight of 2-cyanoacrylate ester, but more or less may be added as necessary to obtain the desired degree of stabilization without incurring loss of cure rate. The amount of boric acid compound added to the adhesive is also determined by many factors, but is generally from about 5 to 1000 ppm., with more or less being added if needed or desired, depending on the molecular weight and equilibrium constant of the particular compound employed. For example, boric acid is typically added in amounts of about 5 to 100 ppm., while an octyl borate would be required in considerably greater amounts to provide the same or comparable molar equivalents of boron. The molar ratio of polyhydroxy to boric acid compound is likewise dependent on the equilibrium of the chelating reaction involved and thus on the types of compounds and 2-cyanoacrylate esters used. If the polyhydroxy compound, for example, is a moderately strong acid, i.e., with $pK_a$ less than 3, the molar ratio should be low to prevent, or at least minimize, retardation of cure by uncomplexed acid. Similarly, if the polyhydroxy compound is neutral, its concentration should be kept low relative to the boric acid compound to prevent initiation of polymerization or transesterification with the 2-cyanoacrylate ester. However, if the polyhydroxy compound is also employed as a stabilizer against free radical polymerization, the molar ratio of polyhydroxy to boric acid compound will normally be high so that an excess of free radical polymerization inhibitor will be present. In general, the relative amount of polyhydroxy compound will range from about 0.1 to 10 moles per mole of boric acid compound.

The chelates used as stabilizers in this invention may be used alone or in conjunction with other inhibitors of anionic polymerization. It is generally desirable with the relatively volatile methyl and ethyl 2-cyanoacrylates to include a gaseous inhibitor such as sulfur dioxide in the formulation to prevent the polymer from forming on the walls of the container above the liquid level. Generally, sulfur dioxide is used as a process stabilizer in the synthesis of the 2-cyanoacrylate ester, as typically described in U.S. Pat. No. 2,756,251. The sulfur dioxide passed through the system during several stages of the processing builds up to a high concentration, which is then removed by pulling vacuum on the ester upon completion of the synthesis procedure.

It may not be necessary to add inhibitors of free radical polymerization to the adhesive when the polyhydroxy compound used to form the chelate is a phenolic compound such as catechol or pyrogallol, which are effective free radical scavengers themselves. Excess polyhydroxy compound may be present from the reaction in situ, or the chelate may partially hydrolyze in the adhesive to regenerate the polyhydroxy compound, which will act to inhibit free radical polymerization if it is a scavenger. However, under certain demanding storage conditions, or when the polyhydroxy compound used is ineffective as a free radical scavenger (e.g., salicyclic acid), it may be desirable to add a free radical inhibitor. As a suitable inhibitor for this purpose, any one of a wide variety of compounds known in the art to stabilize 2-cyanoacrylate adhesive compositions against free radical polymerization is applicable. Such inhibitors include phenolic compounds such as hydroquinone, t-butyl catechol, catechol, p-methoxyphenol, and the like. The conventional free radical polymerization inhibitor, like the anionic polymerization inhibitor, is normally added during the processing of the 2-cyanoacrylate ester. Hence, a free radical polymerization inhibitor is generally introduced into the distillation vessel and the receiver to stabilize the ester in the synthesis thereof. As a result, commercially available 2-cyanoacrylate esters may already contain a certain amount of a conventional free radical polymerization inhibitor such as those mentioned hereinabove. More such inhibitor, however, may be added thereto if greater stability is desired. The total amount of such inhibitor which will be effective for stabilization purposes will range from 10 to 500 ppm. of the total composition.

There may also be present in the adhesive compositions of this invention various other optional ingredients including, for example, plasticizers and thickeners. Plasticizers improve the aging characteristics of the cured bonds by lessening the brittleness thereof. For best performance the amount of plasticizer to be used should not exceed 20% by weight of the total composition. Suitable plasticizers include monofunctional and difunctional aliphatic esters of acids having 1 to 10 carbon atoms such as, for example, dimethyl- and dioctylsebacate, and esters of malonic acid, difunctional aromatic esters, and alkyl and aromatic phosphates and phosphonates. Thickeners, which may be used in amounts of up to 25% by weight, depending in part on their thickening power at room temperature, serve to increase the viscosity of the adhesive so that it may be more easily applied. Among the suitable thickeners for this purpose are included, for example, polymeric alkyl 2-cyanoacrylates, cellulose esters including cellulose acetate butyrate, acrylate resins such as poly (methyl methacrylate) and poly (ethyl methacrylate), and poly (vinyl alkyl ethers) such as poly-(vinyl methyl ether).

The adhesive compositions of the present invention generally may be prepared by adding a given amount of the preformed chelate to the 2-cyanoacrylate ester and mixing at room temperature until the chelate is thoroughly dissolved in the ester. Other anionic polymerization inhibitors desired may already be present in or added to the ester before the chelate is dissolved therein. Any further optional ingredients desired, including the free radical polymerization inhibitor, may be added either prior to or following the addition of the acid chelate. In the in situ variation the boric acid compound and polyhydroxy compound are mixed in with the 2-cyanoacrylate ester at room temperature in the desired proportions. If boric acid itself is used, it may need to be ground before being added to the ester to aid in its solubility. As with the addition of the preformed chelate, any optional ingredients may be added before or after addition of the boric acid and polyhydroxy compound.

The resultant adhesive composition may be used in a variety of applications, including the bonding of household articles, precision instruments, optical lenses, and the like.

The following examples will demonstrate the efficacy of the 2-cyanoacrylate adhesive compositions of this invention. In these examples all percentages and parts are given by weight, unless otherwise specified.

The present adhesive compositions are evaluated on the basis of the following two test procedures:

I. SET TIME TEST

One drop of test adhesive is placed near one edge of a 2.54 cm. by 2.54 cm. by 0.48 cm. phenolic chip. The mating surface of a second chip of the same dimensions is quickly placed thereover and positioned such that half of each chip overlaps the other chip. The lamination is immediately clamped together by means of a #50 medium spring clip. At 15-second intervals an attempt is made to pull the two chips apart using a light peel force. The "set time" is related to the cure rate, and is defined as the time interval between the initial application of the adhesive and the final time at which the chips can no longer be pulled apart manually.

II. AGED VISCOSITY TEST

The test adhesive is sealed into an aluminum tube and aged for 10 days at 70° C. If the initial viscosity of the 2-cyanoacrylate ester is already somewhat high, the aging time is reduced to 7 days. Kinematic viscosity of the adhesive, expressed in centipoise (cps.), is then measured using a calibrated #300 Cannon-Fenske viscometer. A low viscosity indicates good stability, while a viscous sample indicates poor stabilization of the adhesive.

EXAMPLE 1

This example illustrates the effectiveness of the stabilizer of this invention using the in situ variation.

Five samples of the 2-cyanoacrylate adhesive compositions were prepared by adding the indicated amount of the given additive in Table I to a quantity of methyl 2-cyanoacrylate containing about 100 ppm. hydroquinone as free radical polymerization inhibitor and a small amount of sulfur dioxide for protection from vapor phase polymerization. Each adhesive formulation was tested for set time and aged viscosity using the procedures described above. The results are indicated in Table I.

TABLE I

| | Adhesive | | | | |
|---|---|---|---|---|---|
| | A | B | C | D | E |
| I. Additive (ppm.): | | | | | |
| Phosphorus pentoxide | 0 | 10 | 0 | 0 | 0 |
| ortho-Boric acid | 0 | 0 | 48 | 0 | 48 |
| Pyrogallol | 0 | 0 | 0 | 200 | 200 |
| II. Set Time (sec.) | 15 | 45 | 15 | 15 | 15 |
| III. Aged Viscosity (cps.) | 6.4 | 3.8 | 5.1 | 5.0 | 3.6 |

As the results clearly show, boric acid and pyrogallol, which are weak acids ($pK_a$ of about 9) somewhat improve the stability of the adhesive. When combined, however, these two compounds form an acidic chelate which is a far more effective stabilizer than either compound alone. In its stabilizing effect, this chelate is comparable to phosphorous pentoxide, a well-known inhibitor. With regard to effect on cure rate, however, the chelate is superior to phosphorus pentoxide because the latter causes an undesirable retardation in cure, while the chelate does not adversely affect the cure rate.

EXAMPLE 2

This example illustrates the stabilizer of this invention using a different monomer.

Four samples of 2-cyanoacrylate adhesive compositions were prepared by adding either 100 ppm. hydroquinone or 180 ppm. pyrogallol as free radical polymerization inhibitor to a butyl 2-cyanoacrylate monomer which was freshly distilled under a nitrogen atmosphere. A given amount of boric acid was added to two of these compositions. Each adhesive was then tested for set time and aged viscosity as in Example 1, and the results are indicated in Table II.

TABLE II

| Free Radical Inhibitor | Amount of Boric Acid Added (ppm.) | Set Time (sec.) | Aged Viscosity (cps.) |
|---|---|---|---|
| Hydroquinone | 0 | 15 | 6.3 |
| | 26 | 15 | 6.3 |
| Pyrogallol | 0 | 15 | 5.7 |
| | 26 | 15 | 4.0 |

Due to the presence of a free radical inhibitor in all of the adhesives (which is required for stability at 70° C.), the aged viscosity obtained for each adhesive mostly reflects stabilization against anionic polymerization. Because the hydroxyl groups of hydroquinone are para to each other and thus cannot form acidic chelates with boric acid, hydroquinone and boric acid together are ineffective as a stabilizer, whereas pyrogallol and boric acid form a chelate which acts as a suitable anionic polymerization inhibitor.

EXAMPLE 3

This example illustrates the use of various aromatic polyhydroxy compounds which can be used in accordance with this invention.

Six samples of 2-cyanoacrylate adhesive compositions were prepared by adding boric acid and the indicated polyhydroxy compound in the indicated amounts to an ethyl 2-cyanoacrylate monomer containing 75 ppm. hydroquinone and a small amount of sulfur dioxide to prevent vapor phase polymerization. The molar concentrations of each polyhydroxy compound added were approximately the same, and they were four times greater than the molar concentration of boric acid. Each adhesive was evaluated for set time and aged viscosity as in Example 1, with the results summarized in Table III.

TABLE III

| Polyhydroxy Compound | Amount of Polyhydroxy Compound (ppm.) | Amount of Boric Acid (ppm.) | Set Time (sec.) | Aged Viscosity (cps.) |
|---|---|---|---|---|
| none | 0 | 0 | 15 | 17.8 |
| none | 0 | 20 | 15 | 17.8 |
| Catechol | 136 | 20 | 15 | 9.2 |
| Pyrogallol | 177 | 20 | 15 | 7.4 |
| Salicylic acid | 190 | 0 | 30 | 13.0 |
| Salicylic acid | 183 | 20 | 30 | 6.5 |

It can be seen from the results that all of the adhesives containing the chelates are effectively stabilized over the control adhesive containing boric acid alone. Salicylic acid, which is a moderately strong acid, sufficiently stabilizes the adhesive, but retards the cure rate when used alone at these concentrations. However, when boric acid is added together with the salicylic acid, the chelate formed thereby acts as an even more effective stabilizer which does not further reduce the cure rate.

EXAMPLE 4

This example illustrates the effect of increasing the relative amount of boric acid on the stability of ethyl 2-cyanoacrylate.

The 2-cyanoacrylate ester of Example 3 was used to prepare nine adhesive compositions by adding the given amount of pyrogallol and boric acid thereto. The resulting adhesives were evaluated for set time and aged viscosity as in Example 1, and the results are summarized in Table IV.

TABLE IV

| Amount of Pyrogallol (ppm.) | Amount of Boric Acid (ppm.) | Ratio of Moles Pyrogallol to Moles Boric Acid | Set Time (sec.) | Aged Viscosity (cps.) |
|---|---|---|---|---|
| 0 | 0 | 0 | 15 | 15.9 |
| 180 | 0 | — | 15 | 19.9 |
| 180 | 5 | 17.6 | 15 | 11.0 |
| 180 | 10 | 8.8 | 15 | 9.8 |
| 365 | 20 | 8.9 | 15 | 9.5 |
| 180 | 20 | 4.4 | 15 | 8.7 |
| 90 | 20 | 2.2 | 15 | 8.7 |
| 180 | 50 | 1.8 | 15 | 7.3 |
| 180 | 100 | 0.9 | 15 | 6.2 |

The results indicate that, in the presence of the pyrogallol, as little as 5 ppm. boric acid gives some improvement in the stability of the adhesive. Increasing the boric acid concentration up to 100 ppm. effects even greater stability without compromising cure speed.

EXAMPLE 5

This example illustrates the effect of further relative increases in boric acid concentration on the stability of ethyl 2-cyanoacrylate.

The indicated amounts of pyrogallol and boric acid were added to the 2-cyanoacrylate monomer of Example 3 which had aged to a viscosity of 10.6 cps. At a level of 400 ppm. the boric acid did not completely dissolve in the monomer. The set time and aged viscosity of each adhesive was determined as in the test procedures described above, with the viscosity test carried out for 7 days instead of 10 days. A control containing an added amount of sulfur dioxide as a stabilizer was used for comparison purposes.

The results are indicated in Table V.

TABLE V

| | | A | B | C | D | E | F | G |
|---|---|---|---|---|---|---|---|---|
| | | | | | Adhesive | | | |
| I. | Additive (ppm.): | | | | | | | |
| | Sulfur dioxide | 0 | 50 | 0 | 0 | 0 | 0 | 0 |
| | ortho-Boric acid | 0 | 0 | 0 | 100 | 100 | 200 | <400 |
| | Pyrogallol | 0 | 0 | 180 | 0 | 180 | 180 | 180 |
| II. | Set Time (sec.) | 15 | >60 | 15 | 15 | 30 | 45 | >60 |
| III. | Aged Viscosity (cps.) | 57.5 | 24.9 | 58.2 | 33.7 | 17.6 | 18.0 | 17.7 |

Sulfur dioxide is a fairly effective stabilizer, but retards the cure rate of the adhesive considerably. It can be seen from the results that increasing the relative amount of boric acid added to the adhesive above a certain level results in little gain in adhesive stability, with substantial loss in cure rate.

EXAMPLE 6

This example illustrates the use of boric acid derivatives in forming the chelate stabilizers of this invention.

Four samples of 2-cyanoacrylate adhesive compositions designated as Samples A-D in Table VI were prepared by adding the indicated amount of either boric oxide (Samples A and B) or triethyl borate (Samples C and D) to the same 2-cyanoacrylate monomer used in Example 5. To Samples B and D were added 180 ppm. pyrogallol. The set time and aged viscosity of each adhesive was determined as in Example 5, and the results are indicated in Table VI.

TABLE VI

| Sample | Amount of Pyrogallol (ppm.) | Amount of Boric Oxide (ppm.) | Amount of Triethyl Borate (ppm.) | Set Time (sec.) | Aged Viscosity (cps.) |
|---|---|---|---|---|---|
| A | 0 | 56 | 0 | 15 | 46.5 |
| B | 180 | 56 | 0 | 15 | 23.3 |
| C | 0 | 0 | 236 | 15 | 46.8 |
| D | 180 | 0 | 236 | 15 | 36.8 |

The results show that boric acid derivatives are also effective in forming chelates which increase adhesive stability without incurring loss in cure rate.

EXAMPLE 7

This example illustrates the effect of increasing the relative concentration of boric acid using a different 2-cyanoacrylate monomer.

Five samples of a 2-cyanoacrylate adhesive composition were prepared by adding the indicated amount of boric acid and 180 ppm. pyrogallol to a quantity of methyl 2-cyanoacrylate monomer containing 100 ppm. hydroquinone as free radical polymerization inhibitor and a small amount of sulfur dioxide as process stabilizer. The boric acid was soluble at all concentrations. Each adhesive was evaluated for set time and aged viscosity as in Example 5. The results are indicated in Table VII.

TABLE VII

| Amount of Boric Acid (ppm.) | Set Time (sec.) | Aged Viscosity (cps.) |
|---|---|---|
| 0 | 15 | 4.9 |
| 100 | 15 | 3.3 |
| 200 | 60 | 3.3 |
| 400 | >60 | 3.2 |
| 600 | >60 | 3.2 |

The results indicate that, as in the case of ethyl 2-cyanoacrylate, excess boric acid in the methyl 2-cyanoacrylate monomer results in little gain in adhesive stability, while the cure rate is retarded significantly.

EXAMPLE 8

This example illustrates the effect of increasing the relative amount of polyhydroxy compound on the stability of ethyl 2-cyanoacrylate.

The 2-cyanoacrylate ester of Example 5 was used to prepare five adhesive compositions by adding 100 ppm. boric acid and increasing amounts of pyrogallol up to 400 ppm. thereto. The resulting adhesives were evaluated for set time and aged viscosity as in Example 5, and the results are indicated in Table VIII.

TABLE VIII

| Amount of Pyrogallol (ppm.) | Ratio of Moles Pyrogallol to Moles Boric Acid | Set Time (sec.) | Aged Viscosity (cps.) |
| --- | --- | --- | --- |
| 0 | 0 | 15 | 64.6 |
| 50 | 0.25 | 15 | 42.3 |
| 100 | 0.5 | 15 | 33.1 |
| 200 | 1.0 | 15 | 35.6 |
| 400 | 2.0 | 30 | 39.7 |

The adhesive mixture containing 50 ppm. pyrogallol developed a pink color. It can be seen that the adhesive containing 400 ppm. pyrogallol showed decreased stability and cure speed. However, this amount of pyrogallol may be desirable when additional protection from free radical polymerization is desired or required in the adhesive.

EXAMPLE 9

This example illustrates the use of various aliphatic polyhydroxy compounds to form the acid chelate.

The 2-cyanoacrylate monomer of Example 5 having a viscosity of 14.5 cps. was used to prepare several adhesives by adding boric acid and the indicated polyhydroxy compound thereto in the given amounts. Each adhesive was analyzed for set time and aged viscosity as in Example 5. The results are given in Table IX.

TABLE IX

| Amount of Boric Acid (ppm.) | Polyhydroxy Compound | Amount of Polyhydroxy Compound (ppm.) | Set Time (sec.) | Aged. Viscosity (cps.) |
| --- | --- | --- | --- | --- |
| 0 | none | 0 | 15 | 64.5 |
| 100 | none | 0 | 15 | 46.9 |
| 0 | Oxalic acid . 2H$_2$O | 30 | 15 | 51.1 |
| 100 | Oxalic acid . 2H$_2$O | 30 | 15 | 19.6 |
| 0 | L-Tartaric acid | 192 | 15 | 79.9 |
| 100 | L-Tartaric acid | 192 | 15 | 21.1 |

The results show that oxalic acid, a relatively strong diacid, does not overstabilize the adhesive when used in small amounts with boric acid. In fact, oxalic acid forms a chelate which is very effective as an anionic polymerization inhibitor. Tartaric acid, which is both a diacid and an α-hydroxy acid, also forms a chelate which acts as a good stabilizer. The tartaric acid presumably forms a five-membered-ring chelate via the carboxyl and α-hydroxyl groups (see Kustin and Pizer, "JACS", 91 (1969) 317).

EXAMPLE 10

This example illustrates the variation of this invention wherein the acid chelate is formed in a separate step and added to the 2-cyanoacrylate adhesive.

A total of 15.5 g. (0.25 mole) boric acid and 63.1 g. (0.5 mole) pyrogallol were charged into a reaction vessel and refluxed in 1,2-dichloroethane, using a reverse Dean-Stark receiver to collect the water by-product. Heating was discontinued when 13.5 g. (0.75 mole) water was collected and the reaction mixture became homogeneous. A total of 54.5 g. of product (84% of theoretical yield) crystallized on cooling.

The boric acid chelate thus obtained was added in the indicated amount of the ethyl 2-cyanoacrylate monomer used in Example 5. The set time and aged viscosity of the adhesive (vs. the control containing no added stabilizer) were determined as in Example 5, and the results are indicated in Table X.

TABLE X

| Amount of Chelate Added (ppm.) | Set Time (sec.) | Aged Viscosity (cps.) |
| --- | --- | --- |
| 0 | 15 | 101.4 |
| 20 | 15 | 84.1 |
| 40 | 15 | 70.9 |
| 200 | 15 | 34.9 |
| 400 | 15 | 29.7 |
| 800 | 60 | 29.4 |

It can be seen from the results that when the chelate is first prepared and then added to the adhesive in a separate step, the chelate acts very effectively to stabilize the adhesive. However, as in the in situ variation, when the chelate is added in an amount which gives a boron concentration above a certain value, the cure rate of the adhesive is retarded significantly with little, if any, gain in stability.

In summary, the present invention is seen to provide a novel class of anionic polymerization inhibitors for 2-cyanoacrylate adhesives which are effective stabilizers and do not significantly retard the cure rate of the adhesive.

Now that the preferred embodiments of the present invention have been described in detail, various modifications and improvements thereon will become readily apparent to those skilled in the art. Accordingly, the spirit and scope of the invention are to be limited only by the appended claims, and not by the foregoing specification.

What is claimed is:

1. An adhesive composition comprising a mixture of:
   A. at least 65% by weight of a monomeric ester of 2-cyanoacrylic acid of the general formula:

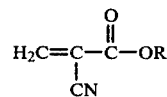

wherein R is an alkyl group having 1 to 10 carbon atoms, an alkenyl group having 2 to 10 carbon atoms, a cyclohexyl group, or a phenyl group; and
   B. a stabilizing amount of a protonic acid chelate containing a boron atom bonded to at least three oxygen atoms formed from reaction of boric acid, or a compound which forms boric acid or tetravalent monoborate ions in the monomeric ester, with a polyhydroxy compound capable of forming said chelate and containing no reactive groups which can initiate anionic polymerization.

2. The composition of claim 1 wherein said chelate is present in said 2-cyanoacrylic acid ester in an amount of 10–600 ppm., based on the weight of the ester.

3. The composition of claim 1 wherein said compound which forms boric acid or tetravalent monoborate ions is an anhydride or a borate ester.

4. The composition of claim 3 wherein said compound is boric oxide or a trialkyl borate.

5. The composition of claim 1 wherein said polyhydroxy compound has at least two hydroxyl groups attached to adjacent carbon atoms or to carbon atoms separated by one atom, such that the chelate formed therefrom contains a five- or six-membered ring.

6. The composition of claim 1 wherein at least one of the hydroxyl groups of said polyhydroxy compound which react to form said chelate is attached to a carbon atom containing a multiple bond.

7. The composition of claim 1 wherein said polyhydroxy compound is selected from the group consisting of ortho-dihydroxybenzenes, ortho-hydroxybenzoic acids, aliphatic α-hydroxy acids, and aliphatic dicarboxylic acids.

8. The composition of claim 7 wherein said polyhydroxy compound is selected from the group consisting of pyrogallol, catechol, salicylic acid, tartaric acid, and oxalic acid.

9. The composition of claim 1 wherein there is additionally present a free radical polymerization inhibitor.

10. The composition of claim 1 wherein there is additionally present a gaseous anionic polymerization inhibitor.

11. The composition of claim 1 wherein R of said 2-cyanoacrylic acid ester is a $C_1$–$C_4$ alkyl group or a $C_2$–$C_4$ alkenyl group.

12. In a process for preparing 2-cyanoacrylate adhesive compositions, the improvement which comprises adding to said composition a stabilizing amount of a protonic acid chelate containing a boron atom bonded to at least three oxygen atoms formed from reaction of boric acid, or a compound which forms boric acid or tetravalent monoborate ions in the monomeric ester, with a polyhydroxy compound capable of forming said chelate and containing no reactive groups which can initiate anionic polymerization.

13. In a process for preparing 2-cyanoacrylate adhesive compositions, the improvement which comprises adding to said composition an amount of boric acid, or a compound which forms boric acid or tetravalent monoborate ions in the monomeric ester, and an amount of a polyhydroxy compound capable of forming a protonic acid chelate containing a boron atom bonded to at least three oxygen atoms with said boric acid or boric-acid-forming compound and containing no reactive groups which can initiate anionic polymerization, the amounts of said boric acid, or boric-acid-forming compound, and said polyhydroxy compound being sufficient to provide a stabilizing amount of said chelate in said 2-cyanoacrylate adhesive.

14. The process of claim 13 wherein said boric acid or boric-acid-forming compound is added in an amount of 5–1000 ppm. and said polyhydroxy compound is added in an amount of 5–500 ppm., based on the weight of the 2-cyanoacrylate ester.

15. The composition of claim 1 wherein said chelate contains a group of the formula

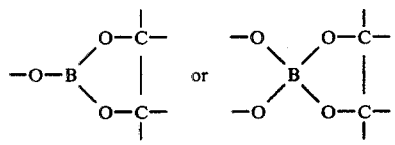

wherein the carbon atoms are directly bonded to each other or separated by one or more atoms.

* * * * *